(12) United States Patent
Lee et al.

(10) Patent No.: US 11,421,819 B2
(45) Date of Patent: Aug. 23, 2022

(54) DISPLAY DEVICE

(71) Applicant: Samsung Display Co., LTD., Yongin-si (KR)

(72) Inventors: Min Woo Lee, Seoul (KR); Tae-Sung Kim, Hwaseong-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 17/115,302

(22) Filed: Dec. 8, 2020

(65) Prior Publication Data
US 2021/0199239 A1    Jul. 1, 2021

(30) Foreign Application Priority Data
Dec. 30, 2019    (KR) .......................... 10-2019-0178171

(51) Int. Cl.
*G06F 1/18* (2006.01)
*F16M 11/26* (2006.01)
*G09F 9/30* (2006.01)

(52) U.S. Cl.
CPC ............. *F16M 11/26* (2013.01); *G06F 1/181* (2013.01); *G09F 9/301* (2013.01)

(58) Field of Classification Search
CPC ....... F16M 11/26; G06F 1/181; G06F 1/1601; G06F 1/1652; G06F 2203/04102; G09F 9/301
See application file for complete search history.

(56) References Cited

U.S. PATENT DOCUMENTS

| 2009/0250177 | A1* | 10/2009 | Byeon | ...................... E06B 9/40 160/323.1 |
| 2013/0271940 | A1* | 10/2013 | Cope | ...................... G09F 21/04 361/809 |
| 2016/0037657 | A1* | 2/2016 | Yoshizumi | ............ G06F 1/1652 361/679.01 |

FOREIGN PATENT DOCUMENTS

| KR | 10-2004-0049500 | 6/2004 |
| KR | 10-2014-0108971 | 9/2014 |
| KR | 10-2014-0121649 | 10/2014 |
| KR | 10-2017-0012330 | 2/2017 |
| KR | 10-2017-0123854 | 11/2017 |
| KR | 10-2017-0136060 | 12/2017 |

\* cited by examiner

*Primary Examiner* — Robert J Hoffberg
*Assistant Examiner* — Hung Q Dang
(74) *Attorney, Agent, or Firm* — Kile Park Reed & Houtteman PLLC

(57) ABSTRACT

Provided is a display device including a lifting module; and a display panel connected to the lifting module. The lifting module includes a first lifter and a second lifter disposed at opposite edges of the display panel; and a groove disposed at an edge of each of the first lifter and the second lifter. The display panel includes a display unit; support portions and joint portions disposed on a rear surface of the display unit; and a fixing unit disposed at an edge of the display panel and connecting the display panel to the lifting module. The fixing unit is disposed within the groove disposed at the edge of each of the first lifter and the second lifter.

20 Claims, 16 Drawing Sheets

DISPLAY DEVICE

CROSS-REFERENCE TO RELATED APPLICATION(S)

This application claims priority to and benefits of Korean Patent Application No. 10-2019-0178171 under 35 U.S.C. § 119, filed in the Korean Intellectual Property Office on Dec. 30, 2019, the entire contents of which are incorporated herein by reference.

BACKGROUND

(a) Field of the Invention

The disclosure relates to a display device, and to a display device that lifts and lowers.

(b) Description of the Related Art

Recently, with the development of display-related technology, display devices that may be altered during use, such as folding, rolling in a roll shape, or stretching like a rubber band, have been researched and developed. Since these displays may be modified in various forms, it may be possible to satisfy both a demand for enlarging the display and the demand for reducing the display for portability during use.

Meanwhile, the display device that may be altered may not only be altered in a predetermined form, but may also be altered in various forms in response to a user's request or in accordance with the display device during use. However, according to the altering of the display device, the performance of the display device may vary, or characteristics may be impaired. In addition, when the display device is manufactured to be altered, durability of the display device may be weak during use.

It is to be understood that this background of the technology section is, in part, intended to provide useful background for understanding the technology. However, this background of the technology section may also include ideas, concepts, or recognitions that were not part of what was known or appreciated by those skilled in the pertinent art prior to a corresponding effective filing date of the subject matter disclosed herein.

SUMMARY

Embodiments have been made in an effort to provide a display device that lifts and lowers and may be folded when the display device may be lowered.

An embodiment provides a display device that may include a lifting module; and a display panel connected to the lifting module, wherein the lifting module may include a first lifter and a second lifter disposed at opposite edges of the display panel; and a groove disposed at an edge of each of the first lifter and the second lifter, the display panel may include a display unit; a plurality of support portions and a plurality of joint portions disposed on a rear surface of the display unit; and a fixing unit disposed at an edge of the display panel and connecting the display panel to the lifting module, and the fixing unit may be disposed within the groove disposed at the edge of each of the first lifter and the second lifter.

The plurality of support portions may be spaced apart from each other, and the plurality of support portions may be connected to each other by the plurality of joint portions.

The plurality of support portions may include a metal.

The plurality of joint portions may include an elastic member.

The plurality of joint portions may include a carbon fiber.

The display device may be lifter or lowered.

The display device may be lifted in a first direction, the first lifter and the second lifter may lengthen in the first direction, and the display panel may be unfolded.

The display device may be lowered in a direction opposite to the first direction, the first lifter and the second lifter may shorten in the direction opposite to the first direction, the plurality of support portions may reciprocate in the groove disposed at the edge of each of the first lifter and the second lifter in a second direction perpendicular to the first direction, and the display panel may be folded in a zigzag form with a predetermined width.

A difference between widths of the folded display panel and the plurality of support portions may be less than about 20%.

The display panel may be lowered and folded at the plurality of joint portions, and the plurality of joint portions may be alternately disposed at opposite edges of the folded display panel.

The lifting module may be lowered and the display panel may be folded to store the display device, and the lifting module may be lifted to display an image in the display unit.

A difference between lengths of the groove disposed at the edge of each of the first lifter and the second lifter and the plurality of support portions may be less than about 10%.

The plurality of joint portions may be disposed on first surfaces of the plurality of support portions and may not contact the display unit, and the plurality of joint portions may have a curved shape in the form of an arc.

The plurality of joint portions may be alternately disposed on first surfaces and second surfaces of the plurality of support portions, a predetermined number of the plurality of joint portions may be disposed to not contact a rear surface of the display unit, and a predetermined number of the plurality of joint portions may be disposed to contact the rear surface of the display unit.

An embodiment provides a display device that may include a lifting module; and a display panel connected to the lifting module, wherein the lifting module may include a first lifter and a second lifter disposed at opposite edges of the display panel; and a groove disposed at an edge of each of the first lifter and the second lifter, the display panel may include a display unit; a plurality of support portions and plurality of connectors disposed on a rear surface of the display unit; and a fixing unit disposed at an edge of the display panel and connecting the display panel to the lifting module, the fixing unit may be disposed within the groove disposed at the edge of each of the first lifter and the second lifter, and the plurality of support portions and the plurality of connectors may be in contact with the rear surface of the display unit.

The plurality of support portions and the plurality of connectors may be coplanar, the plurality of support portions may include a metal, and the plurality of connectors may include a polymer material.

An embodiment provides a display device that may include a lifting module; and a display panel connected to the lifting module, wherein the lifting module may include a first lifter and a second lifter disposed at opposite edges of the display panel, the display panel may include a plurality of support portions disposed on a rear surface of the display panel, and a plurality of joint portions disposed to connect the plurality of support portions, the lifting module may be lifted to unfold the display panel, and the lifting module may be lowered to fold the display panel at the plurality of joint portions.

The display device may further include a groove disposed at an edge of each of the first lifter and the second lifter; and a fixing unit disposed in the groove at the edge of each of the first lifter and the second lifter, wherein the fixing unit may be connected to the display panel, and lifting module may be lowered and the fixing unit may reciprocate left and right within the groove at the edge of each of the first lifter and the second lifter.

The lifting module may be lifted in a direction of gravity, in a direction opposite to the direction of gravity, or in a direction perpendicular to the direction of gravity.

A difference between widths of the folded display panel and the plurality of support portions may be less than about 20%.

According to embodiments, a display device that lifts and lowers and is folded when the display device is lowered is provided.

BRIEF DESCRIPTION OF THE DRAWINGS

The above and other aspects and features of the disclosure will become more apparent by describing in detail embodiments thereof with reference to the attached drawings, in which.

DETAILED DESCRIPTION OF THE EMBODIMENTS

Figure 1:
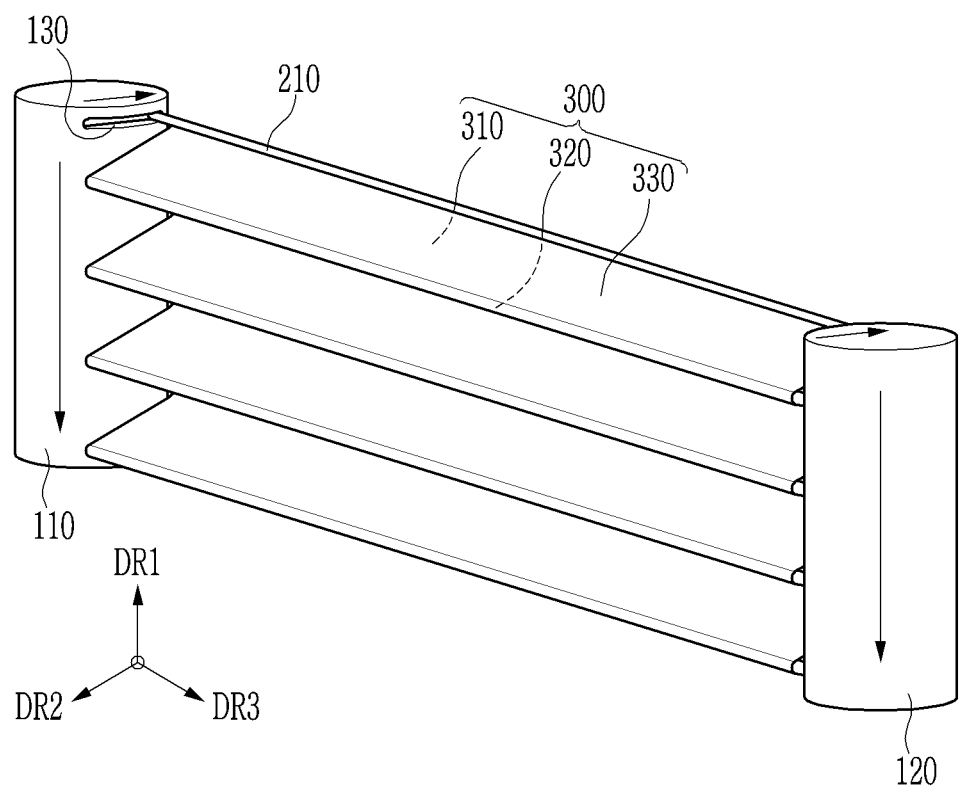
FIG. 1 schematically illustrates a display device according to an embodiment.

The disclosure will be described more fully hereinafter with reference to the accompanying drawings, in which embodiments are shown. As those skilled in the art would appreciate, the described embodiments may be modified in various different ways, all without departing from the spirit or scope of the disclosure.

To clearly describe the disclosure, parts that are irrelevant to the description are omitted, and like numerals refer to like or similar elements throughout the specification.

Further, since sizes and thicknesses of elements shown in the accompanying drawings are arbitrarily given for better understanding and ease of description, the disclosure is not limited to the illustrated sizes and thicknesses. In the drawings, the thicknesses of layers, films, panels, regions, for example, are exaggerated for clarity. In the drawings, for better understanding and ease of description, the thicknesses of some layers and areas are exaggerated.

As used herein, the term "and/or" includes any and all combinations of one or more of the associated listed items. Throughout the disclosure, the expression "at least one of a, b or c" indicates only a, only b, only c, both a and b, both a and c, both b and c, all of a, b, and c, or variations thereof.

The terms "and" and "or" may be used in the conjunctive or disjunctive sense and may be understood to be equivalent to "and/or." In the specification and the claims, the phrase "at least one of" is intended to include the meaning of "at least one selected from the group of" for the purpose of its meaning and interpretation. For example, "at least one of A and B" may be understood to mean "A, B, or A and B."

It will be understood that although the terms "first," "second," etc. may be used herein to describe various components, these components should not be limited by these terms. These components are only used to distinguish one component from another. For instance, a first element or component discussed below could be termed a second element or component without departing from the teachings of the disclosure. Similarly, the second element or component could also be termed the first element or component.

As used herein, the singular forms "a," "an," and "the" are intended to include the plural forms as well, unless the context clearly indicates otherwise.

It will be understood that when an element such as a layer, film, region, or substrate is referred to as being "on" another element, it can be directly on the other element or intervening elements may also be present. In contrast, when an element is referred to as being "directly on" another element, there are no intervening elements present. Further, the word "over" or "on" means positioning on or below the object portion, and does not necessarily mean positioning on the upper side of the object portion based on a gravity direction. Further when a layer, film, region, substrate, or area, or element, is referred to as being "below" another layer, film, region, substrate, or area, or element, it may be directly below the other layer, film, region, substrate, or area, or element, or intervening layers, films, regions, substrates, or areas, or elements, may be present therebetween. Conversely, when a layer, film, region, substrate, or area, or element, is referred to as being "directly below" another layer, film, region, substrate, or area, or element, intervening layers, films, regions, substrates, or areas, or elements may be absent therebetween. Further, "over" or "on" may include positioning on or below an object and does not necessarily imply a direction based upon gravity.

The spatially relative terms "below", "beneath", "lower", "above", "upper", or the like, may be used herein for ease of description to describe the relations between one element or component and another element or component as illustrated in the drawings. It will be understood that the spatially relative terms are intended to encompass different orientations of the device in use or operation, in addition to the orientation depicted in the drawings. For example, in the case where a device illustrated in the drawing is turned over, the device positioned "below" or "beneath" another device may be placed "above" another device. Accordingly, the illustrative term "below" may include both the lower and upper positions. The device may also be oriented in other directions and thus the spatially relative terms may be interpreted differently depending on the orientations.

In addition, unless explicitly described to the contrary, the word "comprise" and variations such as "comprises" or "comprising" "includes" and/or "including", "have" and/or "having" are used in this specification, they or it may specify the presence of stated features, integers, steps, operations, elements and/or components, but do not preclude the presence or addition of other features, integers, steps, operations, elements, components, and/or any combination thereof.

Further, in the specification, the phrase "in a plan view" means when an object portion is viewed from above, and the phrase "in a schematic cross-sectional view" means when a schematic cross-section taken by vertically cutting an object portion is viewed from the side.

Additionally, the terms "overlap" or "overlapped" mean that a first object may be above or below or to a side of a second object, and vice versa. Additionally, the term "overlap" may include layer, stack, face or facing, extending over, covering or partly covering or any other suitable term as would be appreciated and understood by those of ordinary skill in the art. The terms "face" and "facing" mean that a first element may directly or indirectly oppose a second element. In a case in which a third element intervenes between the first and second element, the first and second element may be understood as being indirectly opposed to one another, although still facing each other. When an element is described as 'not overlapping' or 'to not overlap' another element, this may include that the elements are spaced apart from each other, offset from each other, or set aside from each other or any other suitable term as would be appreciated and understood by those of ordinary skill in the art.

It will be understood that when a layer, region, or component is referred to as being "connected" or "coupled" to another layer, region, or component, it may be "directly connected" or "directly coupled" to the other layer, region, or component and/or may be "indirectly connected" or "indirectly coupled" to the other layer, region, or component with other layers, regions, or components interposed therebetween. For example, it will be understood that when a layer, region, or component is referred to as being "electrically connected" to another layer, region, or component, it may be "directly electrically connected" to the other layer, region, or component and/or may be "indirectly electrically connected" to the other layer, region, or component with other layers, regions, or components interposed therebetween.

Also, when an element is referred to as being "in contact" or "contacted" or the like to another element, the element may be in "electrical contact" or in "physical contact" with another element; or in "indirect contact" or in "direct contact" with another element.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value.

As used herein, the term "unit" denotes a structure or element as illustrated in the drawings and as described in the specification. However, the disclosure is not limited thereto. The term "unit" is not to be limited to that which is illustrated in the drawings.

Unless otherwise defined, all terms (including technical and scientific terms) used herein have the same meaning as commonly understood by one of ordinary skill in the art to which embodiments pertain. In addition, it will be further understood that terms, such as those defined in commonly-used dictionaries, should be interpreted as having a meaning that is consistent with their meaning in the context of the relevant art and will not be interpreted in an idealized or overly formal sense unless expressly so defined herein.

Hereinafter, a display device according to an embodiment will be described in detail with reference to the accompanying drawings. The display device according to an embodiment relates to a display device that lifts and lowers.

FIG. 1 schematically illustrates a display device according to an embodiment. Referring to FIG. 1, the display device according to an embodiment may include a display panel 300 and a first lifter 110 and a second lifter 120 disposed at opposite edges of the display panel 300. The first lifter 110 and the second lifter 120 may vertically move in a first direction DR1. The first lifter 110 and the second lifter 120 may be collectively referred to as a lifting module.

The first lifter 110 and the second lifter 120 may be cylindrical; however, the disclosure is not limited thereto. The first lifter 110 and the second lifter 120 may include other shapes within the spirit and the scope of the disclosure and are not limited to that which is illustrated.

A fixing unit 210 may be positioned or disposed at an edge of the display panel 300. The display panel 300 may be connected with or coupled with the fixing unit 210. The fixing unit 210 may be disposed in parallel with a third direction DR3.

Grooves 130 may be respectively positioned or disposed at first edges of each of the first lifter 110 and the second lifter 120, and opposite ends of the fixing unit 210 may be positioned or disposed within the grooves 130. The grooves 130 may be disposed in a second direction DR2 that may be perpendicular to the first direction DR1. The fixing unit 210 may move left and right in the second direction DR2 within the grooves 130.

A display unit 330 may be positioned or disposed on a front surface of the display panel 300, and a support portion 310 and a joint portion 320 may be positioned or disposed on a rear surface of the display panel 300. A detailed description will be provided later, but the support portion 310 may include a rigid member or material such as a metal that may support the display panel 300, and the joint portion 320 may include an elastic member or material that may allow the display panel 300 to be folded at the joint portion 320.

Referring to FIG. 1, the display device according to an embodiment is a display device that may lift and lower, and is a display device that may be folded and stored when not in use and expanded when used. To this end, the display device according to an embodiment may include the first lifter 110 and the second lifter 120 which may be respectively positioned or disposed at left and right sides of the display panel 300, and the grooves 130 which may be respectively positioned or disposed at upper ends of each of the respective lifters 110 and 120 as illustrated in FIG. 1. The display panel 300 may be folded or unfolded by lifting or lowering movement of the first lifter 110 and the second lifter 120. When the display panel 300 is folded, the display panel 300 may be folded in a zigzag manner by the left and right movement of the fixing unit 210 positioned or disposed in the grooves 130.

Hereinafter, each area of the display device according to an embodiment will be described in detail with reference to the accompanying drawings.

Figure 2:
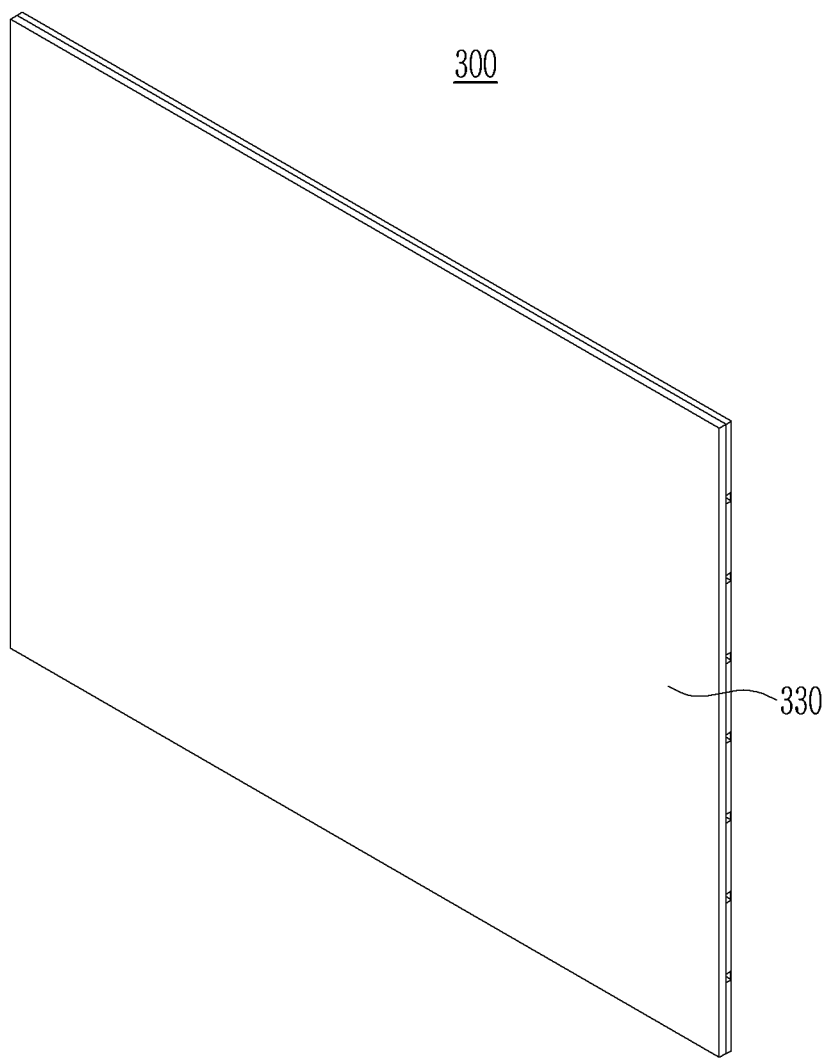
FIG. 2 illustrates a front surface of a display unit of a display panel according to an embodiment.

FIG. 2 illustrates a front surface of a display unit 330 of the display panel 300 according to an embodiment. Referring to FIG. 2, the display unit 330 disposed on the front surface of the display panel 300 may display an image or images.

Figure 3:
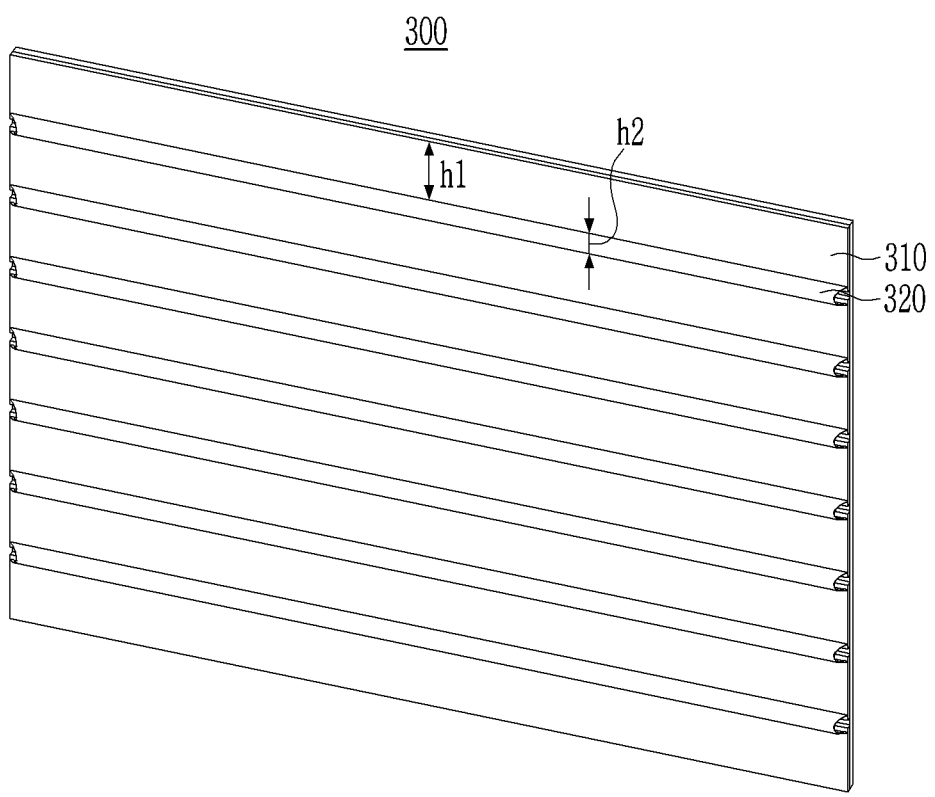
FIG. 3 illustrates a rear surface of a display unit of a display panel according to an embodiment.

FIG. 3 illustrates a rear surface of the display unit 330 of the display panel 300 according to an embodiment. Referring to FIG. 3, support portions 310 may be positioned or disposed on the rear surface of the display panel 300. The support portions 310 may be spaced apart from each other at a predetermined distance or distances, and may be connected to or coupled to the joint portions 320.

The support portions 310 may include a rigid material. For example, the support portions 310 may include a metal. A width h1 of the support portions 310 may be in a range of about 700 mm to about 900 mm, but the disclosure is not limited thereto.

The joint portions 320 may include a soft material. For example, the joint portions 320 may include an elastic member or material, and by way of example, may include a carbon fiber. A width h2 of the joint portions 320 may be in a range of about 3 mm to about 5 mm, but the disclosure is not limited thereto.

Figure 4:
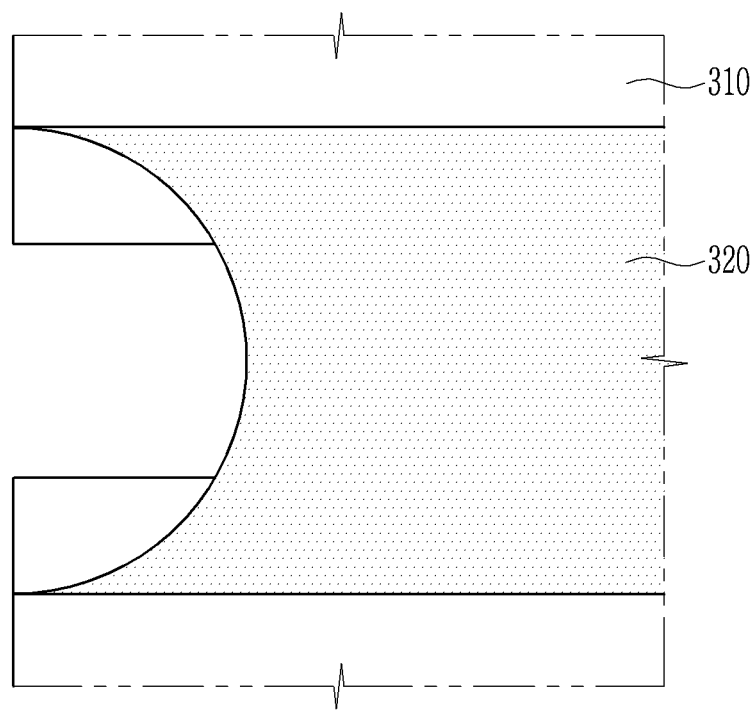
FIG. 4 illustrates a support portion and a joint portion as enlarged for detail.

FIG. 4 illustrates a support portion 310 and a joint portion 320 of FIG. 3 enlarged for detail. Referring to FIG. 4, the support portions 310 may be spaced apart from each other at a predetermined distance or distances and may be connected by or coupled by the joint portion 320. The joint portion 320 may have a curved surface forming an arc, and may connect or couple the support portions 310. In this way, the curved joint portion 320 may prevent the display panel 300 from protruding to the outside when the display panel 300 may be folded. Although a configuration in which the joint portion 320 may be curved is illustrated in FIG. 4, the joint portion 320 may be flat. The joint portion 320 may connect or couple the support portions 310 with a plane.

Figure 5:
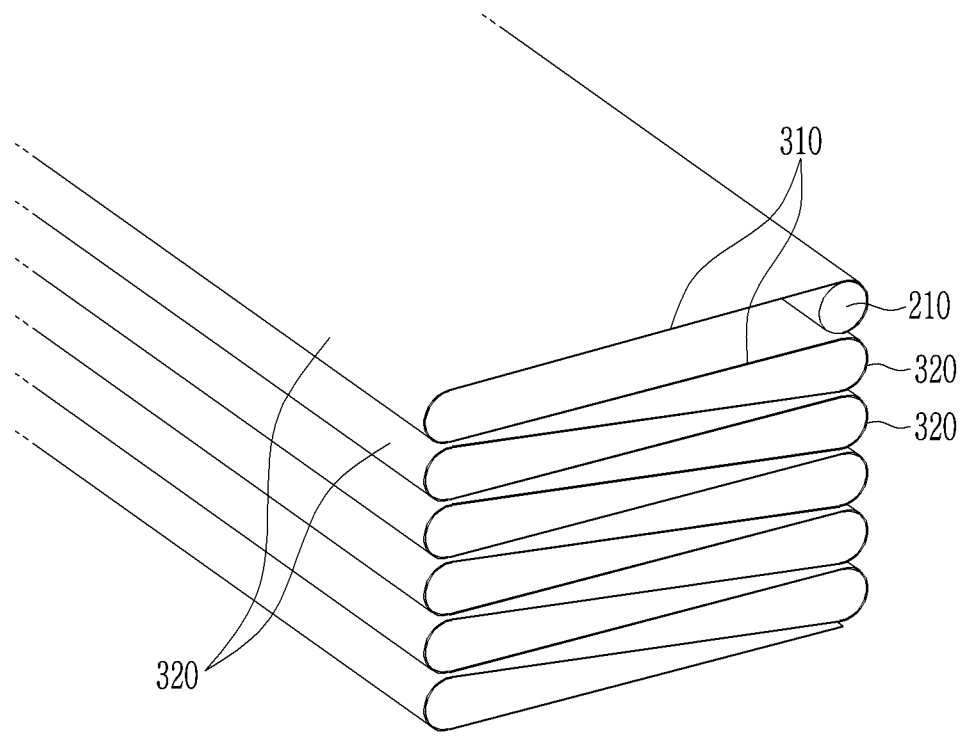
FIG. 5 illustrates a folded state of a display panel.

FIG. 5 illustrates a folded state of the display panel 300. Referring to FIG. 5, the display panel 300 may be folded in a zigzag form, and joint portions 320 may be alternately positioned or disposed one by one at opposite edges thereof. The display panel 300 may be folded in a zigzag form at the joint portions 320, and a thickness of the display panel 300 may be minimized when the display panel 300 is folded.

Figure 6:
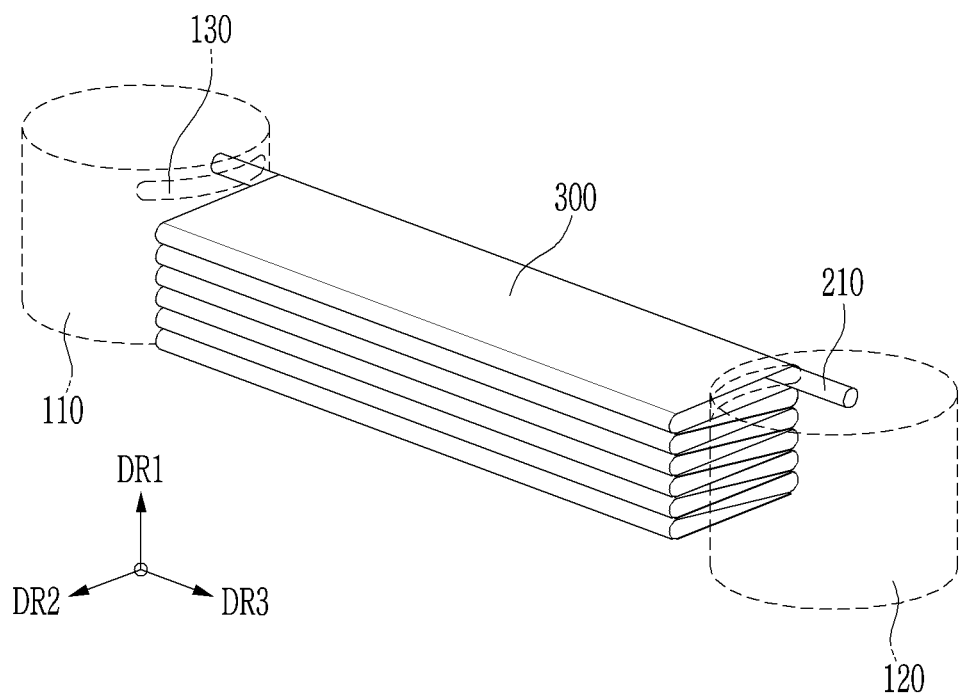
FIG. 6 illustrates a display device in which a display panel is folded.

FIG. 6 illustrates a display device in which the display panel 300 may be folded. Referring to FIG. 6, the folded display device may have a low or reduced height because the first lifter 110 and the second lifter 120 may be lowered. The fixing unit 210 may be connected to or coupled to the grooves 130 positioned or disposed in the first lifter 110 and the second lifter 120, and the display panel 300 may be connected to or coupled to the fixing unit 210. The display panel 300 may be folded in a zigzag manner as illustrated in FIG. 5. A length of the groove 130 may be similar to a width of the support portion 310. For example, a difference between the length of the groove 130 and the width of the support portion 310 may be within about 10%. When the groove 130 has a length that is similar to that of the support portion 310, the fixing unit 210 may move left and right within the groove 130 to allow the display panel 300 to be folded.

The width of the folded display panel may be similar to that of the support portion 310. For example, a difference between the width of the folded display panel 300 and the width of the support portion 310 may be within about 20%. This is because the display panel 300 may be folded at the joint portion 320, so that the joint portion 320 may be positioned or disposed at opposite sides of the display panel 300, and the display panel 300 may be folded by one support portion 310.

Lifting and lowering of the display device according to an embodiment will be described with reference to FIG. 7 to FIG. 10.

Figure 7:
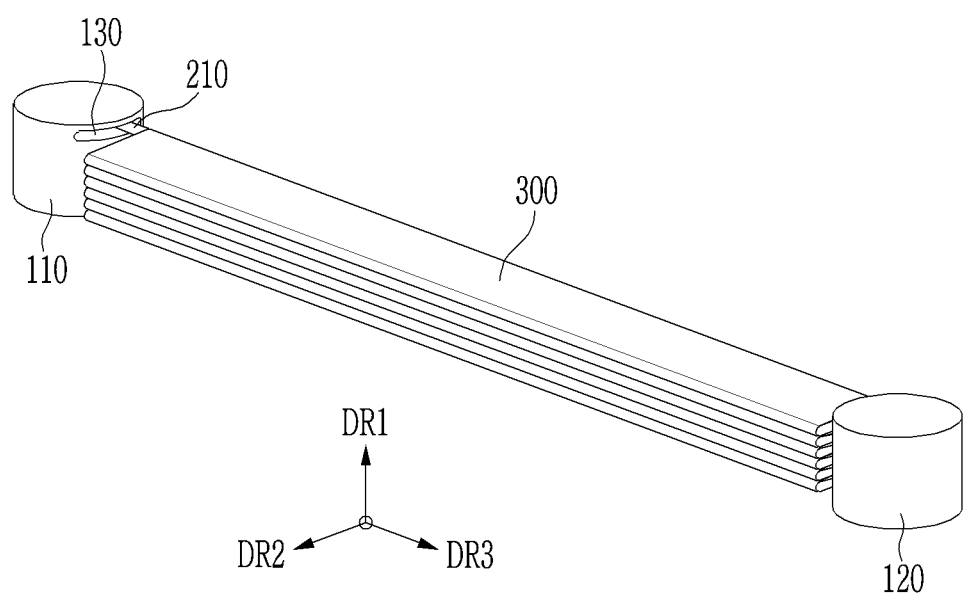
FIG. 7 illustrates a folded state of the display device according to an embodiment.

FIG. 7 illustrates a folded state of the display device according to an embodiment.

As illustrated in FIG. 7, the display panel 300 may be folded in a zigzag manner, and the first lifter 110 and the second lifter 120 may also be lowered to have a low or reduced height. When a user does not use the display device, the user may fold the display device to maximize space utilization as illustrated in FIG. 7. It will be appreciated that the folding of the display device may not be limited to that of a user. The display device may be folded or otherwise unfolded by means other than that of a user. For example, the display device may be folded or unfolded by mechanical means.

Figure 8:
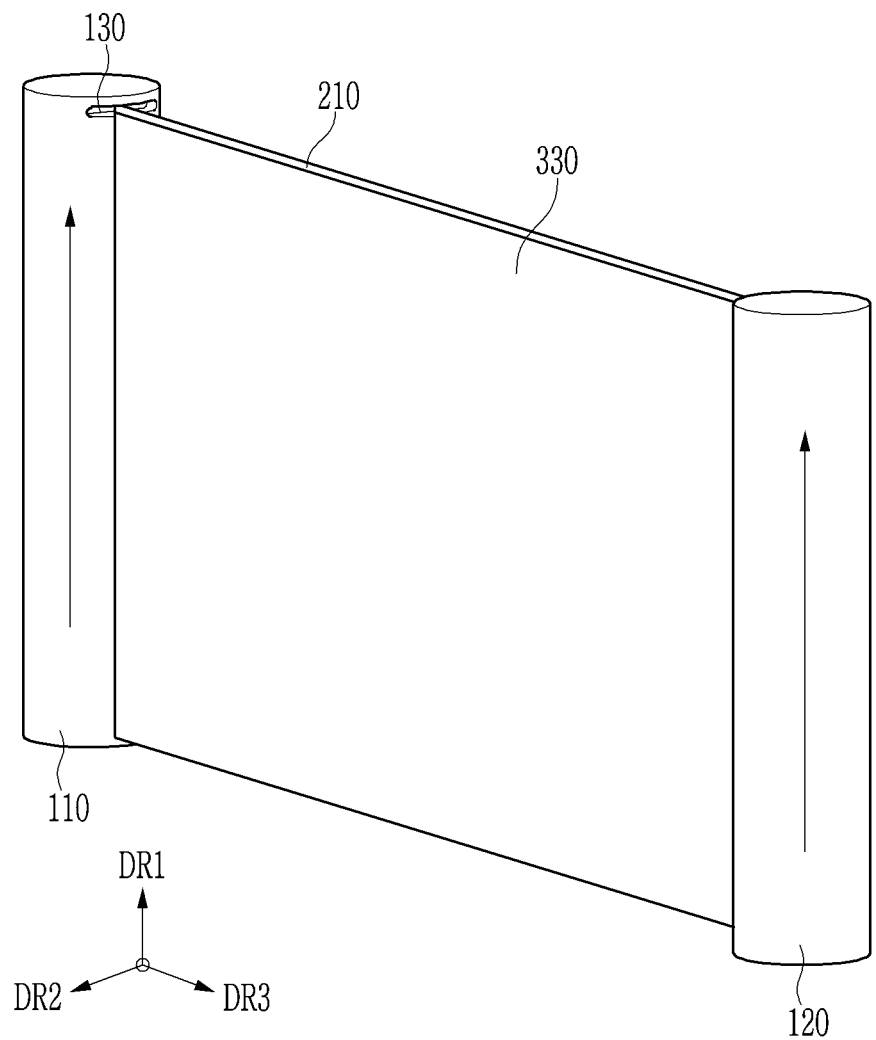
FIG. 8 illustrates an elevated state of the display device of FIG. 7.

FIG. 8 illustrates an elevated state of the display device of FIG. 7. Referring to FIG. 8, the display panel 300 may be unfolded while the first lifter 110 and the second lifter 120 lift along the first direction DR1. The left and right movement of the fixing unit 210 may not be an essential element in the lifting of the display device. For example, when the display device lifts, the display panel 300 may be unfolded only by the upward movement of the first lifter 110 and the second lifter 120.

Figure 9:
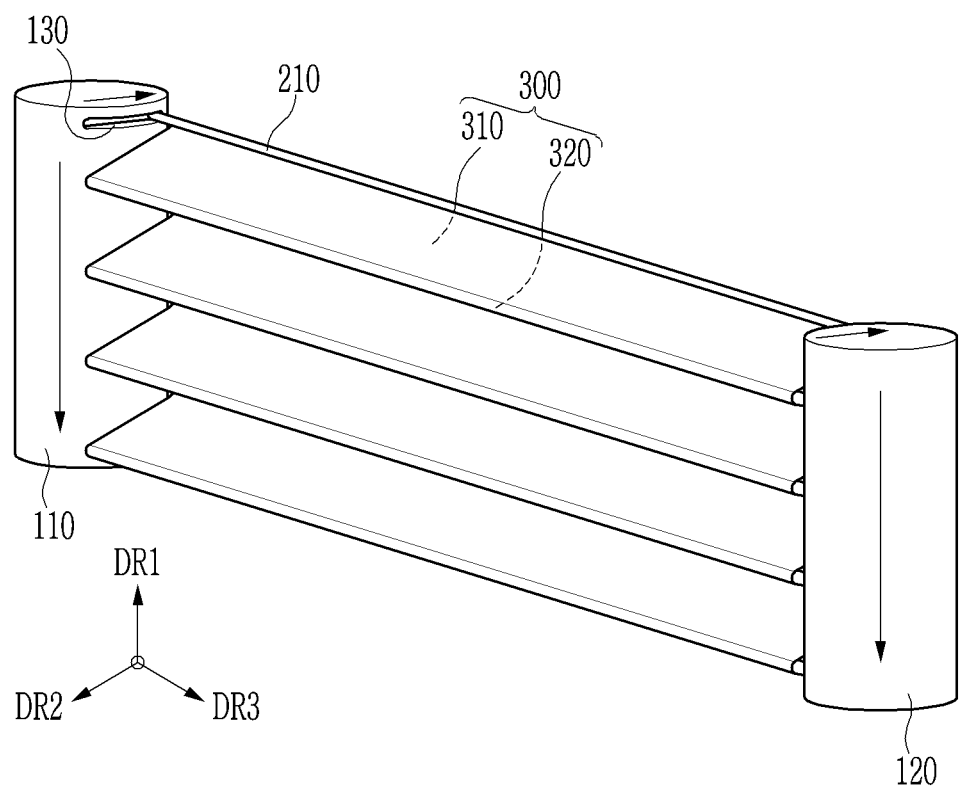
FIG. 9 illustrates a lowered state of the display device of FIG. 8.

FIG. 9 illustrates a lowered state of the display device of FIG. 8. Referring to FIG. 9, when the display device is lowered, the first lifter 110 and the second lifter 120 may be lowered along the first direction DR1. At the same time, the fixing unit 210 disposed in the grooves 130 may move left and right along the second direction DR2. The display panel 300 may be folded by the left and right movement of the fixing part 210. For example, the display panel 300 may be folded in a zigzag form while the joint portions 320 of the display panel 300 may be alternately disposed at opposite edges thereof by the left and right movement of the fixing unit 210.

Figure 10:
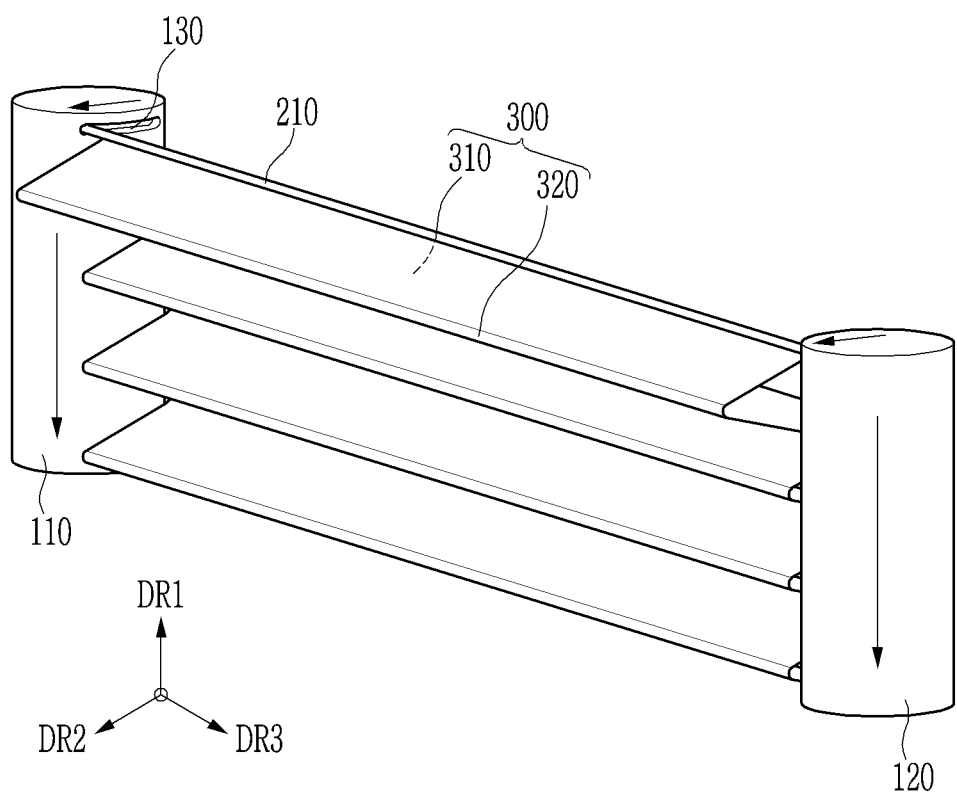
FIG. 10 illustrates a process of lowering the display device of FIG. 9.

FIG. 10 illustrates a process of lowering the display device as in FIG. 9. The support portion 310 may include a material having rigidity, and the joint portion 320 may include a flexible material, such that the support portion 310 may be folded in sequence while the joint portion 320 may be bent. The display device may be lowered as illustrated in FIG. 10, and may be ultimately folded in a state as shown in FIG. 7.

As described above, according to an embodiment, the display device may include the first lifter 110 and the second lifter 120 that may move up and down, and the fixing unit 210 that may move left and right, and the display panel 300 connected to or coupled to the fixing unit 210 may include the support portion 310 and the joint portion 320. The display panel 300 may be folded in a zigzag form while the joint portion 320 may be folded by the vertical movement of the first lifter 110 and the second lifter 120 and the left and right movement of the fixing unit 210. Accordingly, the volume may be minimized when the display device is not used.

In the case of a display device in which a display device may be rolled down on a roller or the like, the thickness of the display panel must be thin in order to be wound on the roller, and in this case, it may be difficult for the display panel to stand during lifting. Since the curvature radius by which the display panel may bend may be limited, a roller size must be large, and it may take up a certain volume even when the display device is not used.

However, according to an embodiment, the display device combines vertical movement with left and right movement to raise and lower the display panel, and the display panel may be folded through the joint portions of the display panel during an elevating process, thereby minimizing the volume. Since the display panel may be supported by the support portion of the display panel, the display panel may be stably supported even in an elevated state.

Hereinafter, a display device according to an embodiment will be described.

Figure 11:
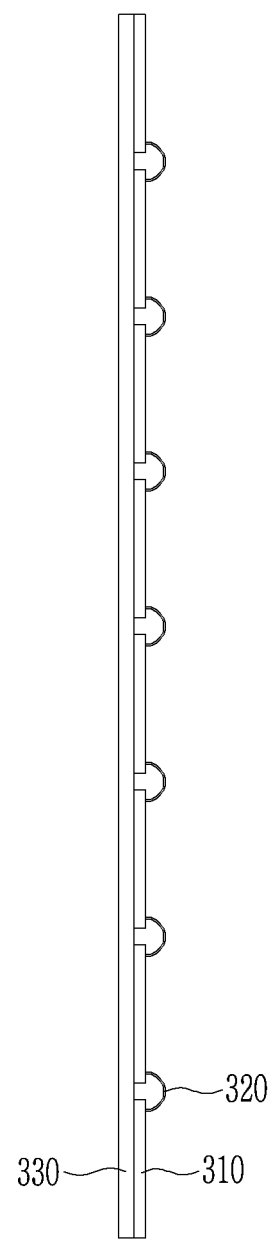
FIG. 11 illustrates a side view of a display panel included in the display device of FIG. 1.

In the display device of FIG. 1 to FIG. 10, the joint portion 320 having an arc may be connected to or coupled to a surface of the support portion 310. FIG. 11 illustrates a schematic side view of the display panel 300 of an above-described embodiment.

Referring to FIG. 11, in the display panel 300 of the previous embodiment, support portions 310 may be spaced apart from each other at a predetermined distance or distances on the rear surface of the display unit 330, and the joint portions 320 may be connected to or coupled to the support portions 310.

Figure 12:
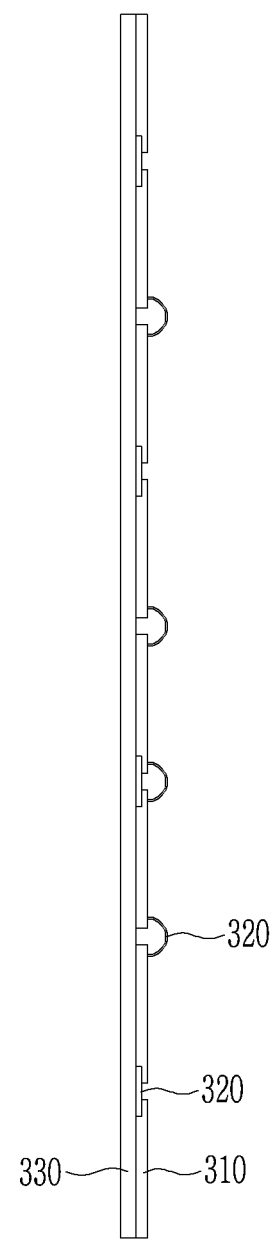
FIG. 12 illustrates a region corresponding to that of FIG. 11 for a display panel according to an embodiment.

In FIG. 11, the joint portions 320 may be positioned or disposed on a same surface, but the joint portions 320 may be alternately positioned or disposed. FIG. 12 illustrates a region corresponding to that of FIG. 11 for the display panel 300 according to an embodiment. Referring to FIG. 12, in the display panel 300 according to an embodiment, the joint portions 320 may be alternately positioned or disposed at opposite sides of the support portions 310. For example, some or a predetermined number of the joint portions 320 may be positioned or disposed in contact with the rear surface of the display unit 330, and some or a predetermined number of the joint portions 320 may be positioned or disposed on an opposite side of the display unit 330 at which they may not be in contact therewith. For example, the joint portions 320 may be alternately positioned or disposed at opposite sides one by one in spaced areas of the support portions 310. When the joint portions 320 are alternately positioned or disposed in left and right regions, the display panel 300 may be more easily folded.

In an embodiment, it is illustrated that a configuration of the joint portion 320 includes a curved surface having a circular arc, but a shape of the joint portion 320 is not limited thereto. The joint portion 320 may connect or couple the support portions 310 with a plane rather than that of a curved surface. In an embodiment of FIG. 12, the joint portions 320 contacting the display unit 330 may have a planar shape, and the joint portions 320 not contacting the display part 330 may have a curved shape. Alternatively, although not separately illustrated, the joint portions 320 and the non-contact joint portions 320 with respect to the display unit 330 may have a planar shape.

Figure 13:
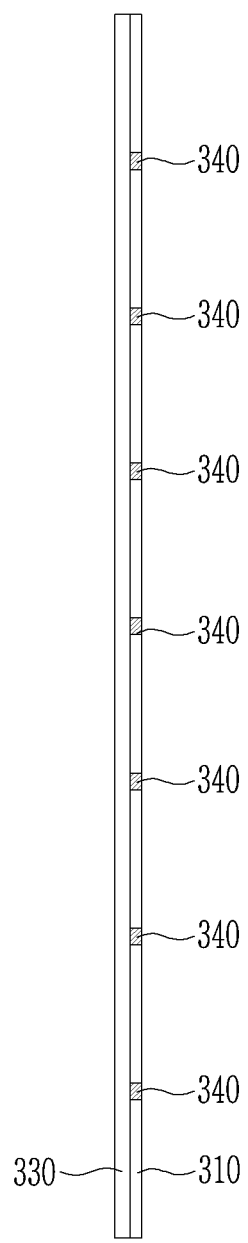
FIG. 13 illustrates a region corresponding to that of FIG. 11 for a display panel according to an embodiment.

FIG. 13 illustrates a region corresponding to that of FIG. 11 for the display panel 300 according to an embodiment. Referring to FIG. 13, the display device according to an embodiment may include connectors 340 connecting or coupling the support portions 310 instead of the joint portions 320 connecting or coupling the support portions 310. In an embodiment of FIG. 11, the joint portions 320 may connect or couple first surfaces of the support portions 310 with second surfaces thereof, and a space may be provided between the support portions 310 connected to or coupled to the joint portions 320. However, in an embodiment of FIG. 13, the connectors 340 may be disposed to fill the space between the support portions 310. For example, the connectors 340 may be disposed on a same plane as the support portions 310 without protruding out of the support portions 310. The connectors 340 may include a material having elasticity. For example, the connectors 340 may include a polymer material. The connectors 340 may have a function similar to that of the joint portions 320. In other words, when the display device is lowered, the display panel 300 may be folded in a zigzag form while being folded in the connectors 340.

Figure 14:
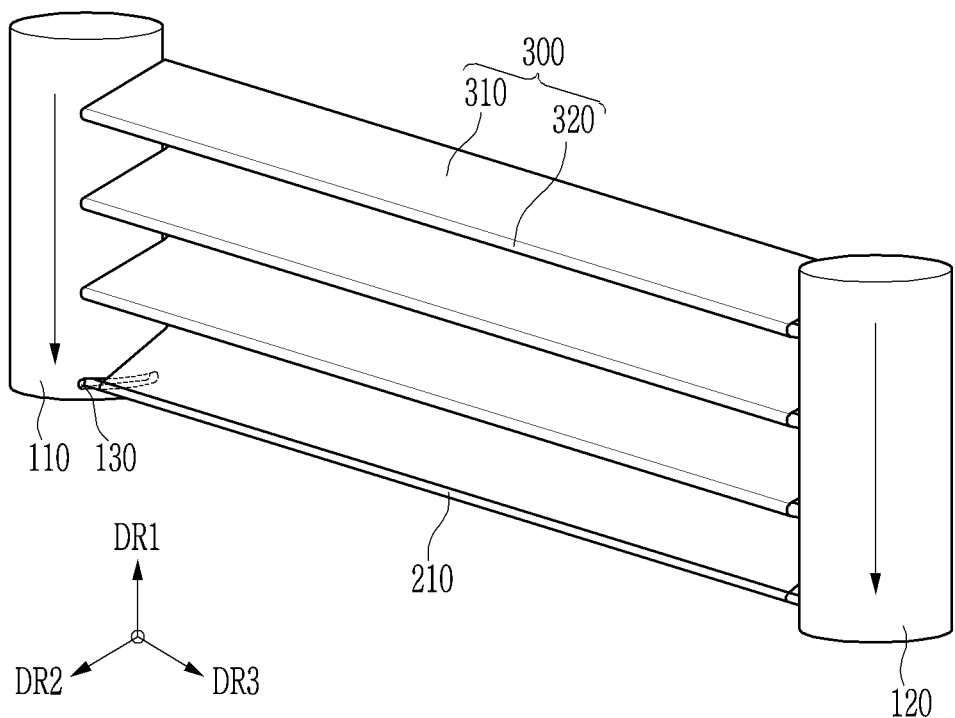
FIG. 14 illustrates a region corresponding to that of FIG. 1 for a display device according to an embodiment.

Hereinafter, a display device according to an embodiment will be described. FIG. 14 illustrates a region corresponding to that of FIG. 1 for a display device according to an embodiment. Referring to FIG. 1, an embodiment of FIG. 1 is related to a display device that may move up and down along the first direction DR1. However, an embodiment of FIG. 14 may be the same as described with reference to FIG. 1 to FIG. 10, except that the lifting and lowering may be performed in a direction that may be opposite to the first direction DR1. Detailed description of the same elements is omitted.

For example, referring to FIG. 1, when the first lifter 110 and the second lifter 120 lift, the display panel 300 may be unfolded from the top to the bottom. In this specification, up and down will be indicated based on the first direction DR1. For example, the first lifter 110 and the second lifter 120 may extend in a downward direction that may be opposite to the first direction DR1, and the display panel 300 may be unfolded at this time. When the display panel 300 is folded, the first lifter 110 and the second lifter 120 may be shortened while traveling in the first direction DR1, and the fixing unit 210 disposed in the grooves 130 may move left and right and the display panel 300 may be folded from above. Unlike an embodiment as illustrated in FIG. 1, the grooves 130 may be disposed in a lower surface of each of the first lifter 110 and the second lifter 120.

Figure 15:
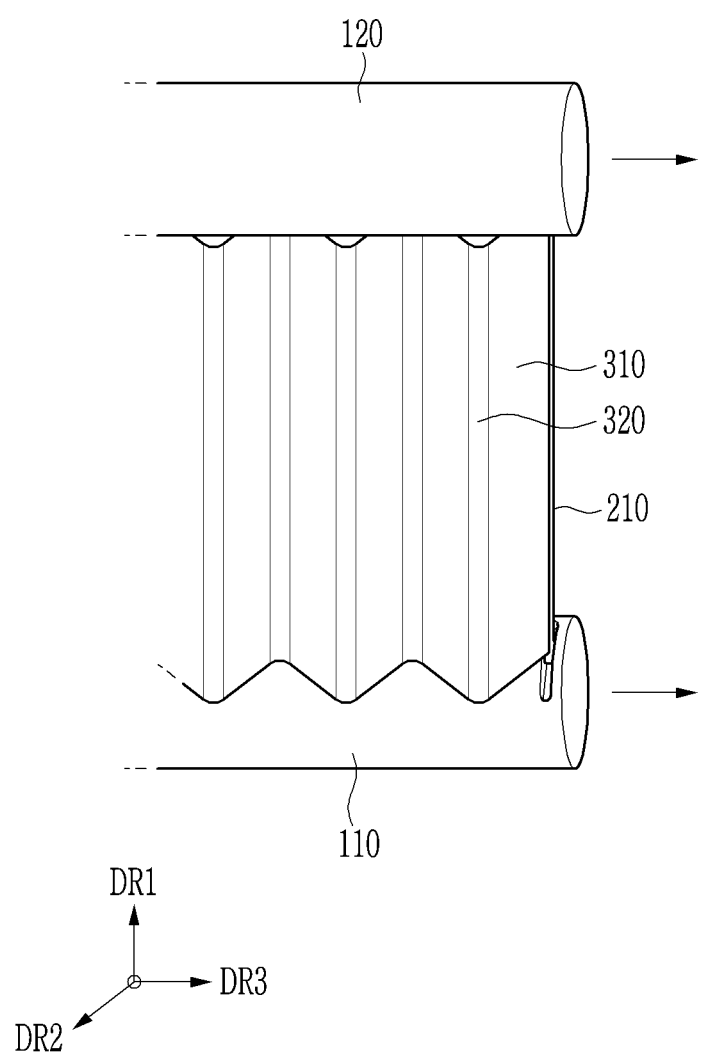
FIG. 15 illustrates a region corresponding to that of FIG. 1 for a display device according to an embodiment.

FIG. 15 illustrates a region corresponding to that of FIG. 1 for a display device according to an embodiment. Referring to FIG. 15, the display device according to an embodiment may be the same as described with reference to FIG. 1 to FIG. 10, except that the display device may be expanded and folded along the third direction DR3. Detailed description of the same elements is omitted. Referring to FIG. 15, the first lifter 110 and the second lifter 120 of the display device according to an embodiment may be elongated in the third direction DR3, and the display panel 300 may be unfolded at this time. When the display panel 300 is folded, the first lifter 110 and the second lifter 120 may be shortened while traveling in a direction that may be opposite to the third direction DR3, and the fixing unit 210 disposed in the grooves 130 may move left and right in the second direction DR2 and fold the display panel 300 in a zigzag manner.

Figure 16:
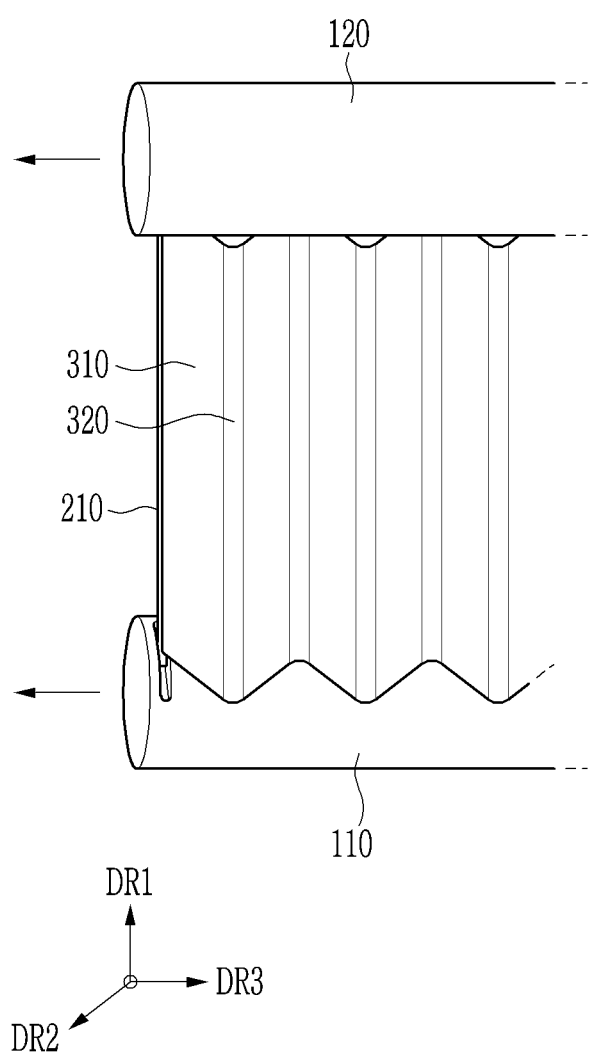
FIG. 16 illustrates a region corresponding to that of FIG. 15 for a display device according to an embodiment.

FIG. 16 illustrates a region corresponding to that of FIG. 15 for a display device according to an embodiment. Referring to FIG. 16, the display device according to an embodiment may be the same as described with reference to FIG. 15, except that the display device may be expanded and folded along a direction that may be opposite to the third direction DR3. Detailed description of the same elements is omitted. Referring to FIG. 16, the first lifter 110 and the second lifter 120 of the display device according to an embodiment may be elongated in the direction that may be opposite to the third direction DR3, and the display panel 300 may be unfolded at this time. When the display panel 300 is folded, the first lifter 110 and the second lifter 120 may be shortened while traveling in the third direction DR3, and the fixing unit 210 disposed in the grooves 130 may move left and right in the second direction DR2 and fold the display panel 300 in a zigzag manner.

While this disclosure has been described in connection with embodiments, it is to be understood that the disclosure is not limited to the disclosed embodiments, but, on the contrary, is intended to cover various modifications and equivalent arrangements included within the spirit and scope of the appended claims.

What is claimed is:

1. A display device comprising:
   a lifting module; and
   a display panel connected to the lifting module, wherein the lifting module includes:
   a first lifter and a second lifter disposed at opposite edges of the display panel; and
   a groove disposed at an edge of each of the first lifter and the second lifter, the display panel includes:
   a display unit;
   a plurality of support portions and a plurality of joint portions disposed on a rear surface of the display unit; and
   a fixing unit disposed at an edge of the display panel and connecting the display panel to the lifting module, and
   the fixing unit is disposed within the groove disposed at the edge of each of the first lifter and the second lifter, and
   the groove is disposed in a direction crossing a lifting direction at the upper end of the lifting module and the fixing unit moves in the crossing direction of the groove.

2. The display device of claim 1, wherein
   the plurality of support portions are spaced apart from each other, and
   the plurality of support portions are connected to each other by the plurality of joint portions.

3. The display device of claim 1, wherein the plurality of support portions include a metal.

4. The display device of claim 1, wherein the plurality of joint portions include an elastic member.

5. The display device of claim 4, wherein the plurality of joint portions include a carbon fiber.

6. The display device of claim 1, wherein the display device is lifted or lowered.

7. The display device of claim 6, wherein
   the display device is lifted in a first direction,
   the first lifter and the second lifter lengthen in the first direction, and
   the display panel is unfolded.

8. The display device of claim 7, wherein
   the display device is lowered in a direction opposite to the first direction,
   the first lifter and the second lifter shorten in the direction opposite to the first direction,
   the plurality of support portions reciprocate in the groove disposed at the edge of each of the first lifter and the second lifter in a second direction perpendicular to the first direction, and
   the display panel is folded in a zigzag form with a predetermined width.

9. The display device of claim 8, wherein a difference between widths of the folded display panel and the plurality of support portions is less than 20%.

10. The display device of claim 9, wherein
    the display panel is lowered and folded at the plurality of joint portions, and
    the plurality of joint portions are alternately disposed at opposite edges of the folded display panel.

11. The display device of claim 6, wherein
    the lifting module is lowered and the display panel is folded to store the display device, and
    the lifting module is lifted to display an image in the display unit.

12. The display device of claim 1, wherein a difference between lengths of the groove disposed at the edge of each of the first lifter and the second lifter and the plurality of support portions is less than 10%.

13. The display device of claim 1, wherein the plurality of joint portions are disposed on first surfaces of the plurality of support portions and do not physically, contact the display unit, and each of the plurality of joint portions have a curved shape in the form of an arc.

14. The display device of claim 1, wherein the plurality of joint portions are alternately disposed on first surfaces and second surfaces of the plurality of support portions, first predetermined number of the plurality of joint portions are disposed to not physically contact the rear surface of the display unit, and a second predetermined number of the joint portions are disposed to physically contact the rear surface of the display unit.

15. A display device comprising:
    a lifting module; and
    a display panel connected to the lifting module, wherein the lifting module includes:
    a first lifter and a second lifter disposed at opposite edges of the display panel; and
    a groove disposed at an edge of each of the first lifter and the second lifter, the display panel includes:
    a display unit;
    a plurality of support portions and a plurality of connectors disposed on a rear surface of the display unit; and
    a fixing unit disposed at an edge of the display panel and connecting the display panel to the lifting module,
    the fixing unit is disposed within the groove disposed at the edge of each of the first lifter and the second lifter, and
    the plurality of support portions and the plurality of connectors physically contact the rear surface of the display unit, and
    the groove is disposed in a direction crossing a lifting direction at the upper end of the lifting module and the fixing unit moves in the crossing direction of the groove.

16. The display device of claim 15, wherein
    the plurality of support portions and the plurality of connectors are coplanar,
    the plurality of support portions include a metal, and
    the plurality of connectors include a polymer material.

17. A display device comprising:
    a lifting module; and
    a display panel connected to the lifting module, wherein the lifting module includes a first lifter and a second lifter disposed at opposite edges of the display panel, and a groove disposed at an edge of each of the first lifter and the second lifter,
    the display panel includes a plurality of support portions disposed on a rear surface of the display panel, and a plurality of joint portions disposed to connect the plurality of support portions, the lifting module is lifted to unfold the display panel, the lifting module is lowered to fold the display panel at the plurality of joint portions, and the groove is disposed in a direction crossing a lifting direction at the upper end of the lifting module and a fixing unit moves in the crossing direction of the groove.

18. The display device of claim 7, further comprising: the fixing unit disposed in the groove at the edge of each of the first lifter and the second lifter, wherein the fixing unit is connected to the display panel, and the lifting module is lowered and the fixing unit reciprocates left and right within the groove at the edge of each of the first lifter and the second lifter.

19. The display device of claim 17, wherein the lifting module is lifted in a direction of gravity or in a direction opposite to the direction of gravity.

20. The display device of claim 17, wherein a difference between widths of the folded display panel and the plurality of support portions is less than 20%.

* * * * *